United States Patent
Beyer (12)

(10) Patent No.: US 6,403,130 B2
(45) Date of Patent: *Jun. 11, 2002

(54) HIGH-METHOXYL PECTIN-ACID CASEIN POLYMER AND PROCESS OF MAKING

(75) Inventor: Richard Beyer, Suva (FJ)

(73) Assignees: Kiwitech Limited, Hawera; University of Otago, Dunedin, both of (NZ)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,422

(22) PCT Filed: Sep. 9, 1997

(86) PCT No.: PCT/NZ97/00110

§ 371 (c)(1),
(2), (4) Date: Sep. 1, 1999

(87) PCT Pub. No.: WO98/09537

PCT Pub. Date: Mar. 12, 1998

(30) Foreign Application Priority Data

Sep. 9, 1996 (NZ) ................................................ 299328

(51) Int. Cl.$^7$ ............................ A23L 1/0524; A23J 3/10
(52) U.S. Cl. .......................... 426/89; 426/577; 426/657
(58) Field of Search ................................. 426/576, 577, 426/573, 138, 277, 276, 89, 657

(56) References Cited

U.S. PATENT DOCUMENTS

| | | | | |
|---|---|---|---|---|
| 4,375,481 A | * | 3/1983 | Kuwabara et al. ............. | 426/93 |
| 4,430,349 A | * | 2/1984 | Malone et al. ................. | 426/34 |
| 4,689,238 A | * | 8/1987 | Hitchner ....................... | 426/571 |
| 5,089,307 A | * | 2/1992 | Ninomiya et al. ........... | 428/35.2 |
| 5,451,673 A | * | 9/1995 | Fishman et al. ............. | 536/123 |
| 5,738,805 A | * | 4/1998 | Chaundy et al. ............ | 252/311 |

FOREIGN PATENT DOCUMENTS

AU A-81184/91 1/1992

OTHER PUBLICATIONS

TIC Gums, Press Release, TIC Gums Offers Pectins for Range of Applications, Jun. 21, 1998, See www.ticgums.com/releases/pectins.htnl.*
Rao et al., Rates of Structure Development During Gelation and Softening of High–Methoxyl Pectin–Sodium Alginate–Fructose Mixture., Food Hydrocolloids., 9 (4): pp. 229–235, 1995, abstract only.*
Borisova et al, Abstract No. 87–09s0183, "Use of fbrous casein–based . . . " (1980).
Satou et al, Abstract No. 82–018950, "Preparation of Acidic Dessert Food" (1982).
Abstract No. 82–31861E, "Fish roe–like prepn., having caviar–like taste and . . . " Kimitsu Kagaku Kenk (1980).
Abstract No. 75–65317W, "Gelled products of stablished sour milk . . . " Koebenhavns Pekti A (1974).
FSTA Online Abstract Accession No. 87–09s0183 "Use of fibrous casein–based textured preparations in meat products" Myasnaya Industriya SSSR, No. 3, 40–43, 1985 see abstract.
Japio Online Abstract Accession No. 82–018950, JP, A, 57018950 (Kyodo Nyugyo KK) Jan. 30, 1982 See Abstract.
Derwent WPAT Online Abstract Accession No. 82–31861E, JP, A, 57043647 (Kimitsu Kagaku Kenk (NISW) Mar. 11, 1982 See Abstract.
Derwent WPAT Online Abstract Accession No. 75–54312W/33, DT 2503638 (Koebenhavns Pekti A) Aug. 7, 1975 See Abstract.

* cited by examiner

Primary Examiner—Arthur L. Corbin
(74) Attorney, Agent, or Firm—Nixon & Vanderhye

(57) ABSTRACT

A polymer is provided which comprises acid casein or a non-toxic soluble salt thereof and high-methoxyl pectin cross-linked into a three-dimensional network. A process for preparing the polymer and edible films and food products comprising the polymer are also provided.

31 Claims, No Drawings

HIGH-METHOXYL PECTIN-ACID CASEIN POLYMER AND PROCESS OF MAKING

TECHNICAL FIELD

The invention relates to novel polymers and to a process for preparing the same. It also relates to products, and in particular food products, comprising the polymer. The invention also particularly relates to edible films formed from the polymer.

BACKGROUND ART

Various edible films are known in the art. For example, Motoki et al have disclosed a milk-protein based film comprising αs-1-casein cross-linked using transglutaminase (*Agric Biol Chem* 51(4): 993–996, (1987)). Caseinate films are also known, for example from the work of Avena-Bustillos and Krochta (*J Food Sci* 58(4): 904–907 (1993)). Whey protein-based edible films are also known, for example, from the work of McHugh et al (*J Food Sci* in press, (1994)). However, these prior art films suffer from the disadvantages that they are either readily soluble or that they tend to be lacking in tensile strength.

An insoluble edible film with tensile strength would be desirable for such applications as separating liquids from solids in the same product. For instance, such a film could be used to encapsulate liquids or slow release additives (such as bread improvers) which cannot be incorporated into soluble films since they disperse instantly.

SUMMARY OF THE INVENTION

It is the object of the present invention to provide a polymer which is suitable for use as an edible film and which will go some way towards overcoming the disadvantages of the prior art, or at least to offer the public a useful choice.

In a first aspect the present invention provides a polymer comprising acid casein or a non-toxic soluble salt thereof and high-methoxyl pectin cross-linked into a 3-dimensional network.

In a second aspect the present invention provides a polymer comprising acid casein or a non-toxic soluble salt thereof and high-methoxyl pectin, wherein the polymer has been prepared by reacting the acid casein or non-toxic soluble salt thereof and the high-methoxyl pectin under alkaline conditions.

In still a further aspect the invention provides a food product comprising a polymer as defined above.

In a further aspect, the invention provides an edible film comprising a polymer as defined above.

The invention also provides a food product which includes an edible film as defined above, either internally or as a coating on all or part of an external surface of the food product.

In a preferred embodiment of the invention, the polymer further comprises an edible plasticizer such as glycerol.

In yet a further aspect, the present invention provides a process for preparing a polymer comprising acid casein or a non-toxic soluble salt thereof and high-methoxyl pectin, the method comprising the steps of:

(a) forming a dispersion comprising acid casein or a non-toxic soluble salt thereof and high-methoxyl pectin, in a non-toxic alkaline environment, (b) heating the disperion for a sufficient time and at a sufficient temperature for reaction between the acid casein or non-toxic soluble salt thereof and the high-methoxyl pectin to take place;

(c) cooling the resulting reaction mixture; and (d) separating off the resulting aqueous phase containing the polymer.

Preferably, the method further includes the step of:

(e) heating the aqueous phase for a sufficient time and at a sufficient temperature to set the polymer.

In more preferred embodiments, the dispersion formed in step (a) includes an edible plasticizer such as glycerol.

In yet further aspects the invention provides a polymer prepared by a method as defined above, a food product comprising a polymer prepared by a method as defined above, and an edible film comprising a polymer as defined above.

DETAILED DESCRIPTION OF THE INVENTION

While the present invention is broadly defined above, it will be appreciated by those persons skilled in the art that it is not limited thereto but that it also includes embodiments of which the following description provides examples. In particular, the various aspects of the invention will be better understood with reference to the more detailed description provided below.

In its primary aspect, the invention provides a novel polymer. This polymer is formed from acid casein, or a non-toxic soluble salt thereof, and high methoxyl pectin.

The polymers of the invention can be prepared by reacting acid casein or a non-toxic soluble salt thereof with high-methoxyl pectin, under alkaline conditions. Without wishing to limit the scope of the invention in any way, it is believed that the R'-COOCH$_3$ group which is present in high-methoxyl pectin condenses with free R"-NH$_2$ groups, which are present as side chains on acid casein or its salts in the presence of base. Thus, it is believed the product of the reaction is an amide which links the ester with the amine, forming R'-CONH-R", thus liking acid casein with high-methoxyl pectin into a 3-dimensional network.

In its preferred forms, the polymers of the invention include an edible (and therefore non-toxic) plasticiser. This plasticiser is included to enhance the flexibility of the resultant polymer and to prevent it becoming brittle.

The presently preferred plasticiser is glycerol although any non-toxic edible plasticiser can be used.

Preparation of Polymer

The preferred methods of preparing the polymers of the invention will now be described in more detail. As an initial step of the preferred method of preparation, a dispersion is formed comprising acid casein or a non-toxic soluble salt thereof and high-methoxyl pectin, in an alkaline environment.

It will be appreciated that either acid casein or a non-toxic soluble salt of acid casein (such as sodium caseinate) may be used to prepare the polymers of the invention. If acid casein itself it used, it will of course be converted to the caseinate form in the alkaline reaction environment.

It is preferred that the acid casein or non-toxic soluble salt thereof is present in an amount of about 8–12% by weight of the dispersion, and more particularly about 10% by weight. In a particularly preferred embodiment, acid casein is present in an amount of 10.29%.

"High-methoxyl pectin" is defined herein as alpha 1, 4 linked polygalactironic acid intermittently esterified at the C6 position with methyl groups, and in which the proportion of C6 esters is not less than about 32%.

The high-methoxyl pectin is preferably present in an amount of about 1 to 3 % by weight of the dispersion, and more preferably about 1.7% by weight. In a particularly preferred embodiment, the high-methoxyl pectin is present in an amount of 1.71% by weight. It is also preferred that the degree of methylation of the high-methoxyl pectin exceeds about 32%. In a particularly preferred embodiment, the degree of methylation is about 60%. It is also preferred that the ratio acid casein or non-toxic soluble salt thereof: high-methoxyl pectin is in the range of about 5.1:1 to 6:1, more preferably 6:1, in order to obtain a polymer having the most desirable properties in terms of insolubility.

In some commercially available preparations of high-methoxyl pectin, there is some residual low molecular weight material. The presence of such material in the polymers of the present invention can render them soluble. Accordingly, it is generally preferred that, prior to use, such low molecular weight material is removed from the high methoxyl pectin. This can be achieved for example by dialysis, or by suspending the high-methoxyl pectin in a suitable solvent, such as ethanol, which will dissolve the low molecular weight material.

The alkaline reaction environment is preferably produced by a non-toxic, non-effervescent base in water. The pH is required to be alkaline in order for the reaction between the acid casein and high-methoxyl pectin to take placed. If however, the pH of the dispersion varies much above about 8.5 to about 9, the resulting polymers may be too alkaline to be edible. In a preferred embodiment of the invention, the base is sodium carbonate, and is preferably present in an amount sufficient to adjust the pH of the dispersion to about 8.5 to 9. Thus, the sodium carbonate is preferably present in an amount of about 1–2% by weight of the dispersion, and, in a particularly preferred embodiment, 1.6% by weight.

Where as is preferred the polymer is to contain an edible plasticiser, the plasticiser is included in the disperion. The edible plasticiser, usually glycerol, is present in the dispersion in an amount of about 4% to 8% by weight of the dispersion, and, in a particularly preferred embodiment, 6% by weight.

The temperature of the water during formation of the dispersion is preferably in the range of about 60° C. to 80° C., more preferably 65° C. to 75° C., and, in a particularly preferred embodiment, 70° C.

When the acid casein, high-methoxyl pectin, sodium carbonate and glycerol are dispersed in the water, the mixture is heated under pressure, conveniently by autoclaving, and preferably to a temperature of about 120° C. (more preferably 121° C.), for about 3 to 7 minutes, more preferably 5 minutes. A relatively high temperature such as about 120° C. is desirable in assisting the reaction between acid casein and high-methoxyl pectin (believed to be condensation) to take place. However, if the temperature is raised much above 120° C., the mixture may brown, which is undesirable.

Following autoclaving, the reaction mixture is cooled, usually to room temperature. The unreacted base will usually precipitate out. The proportions of reactants in the particularly preferred embodiment described in the Example below, have been found to be suitable for achieving this precipitation, thereby avoiding crystals or flecks of base being retained in the polymer. The aqueous phase containing the polymer is then separated out. In some preferred embodiments of the invention, which will be described below, the aqueous phase is poured or sprayed onto a surface to form a film.

The polymer is routinely set by heating. A temperature of about 140° C. to 160° C., and a heating time of about 2 to 4 minutes have been found to be particularly suitable for setting the polymers of the invention. Where, as in a preferred embodiment, the polymer is to be used to form a film, the films are heated at 150° C. for 3 minutes. The heating is desirable in order to set the film quickly. If the film is not set quickly it will continue to flow and can become too thin to be useful.

EXAMPLE

Acid casein (3.087 g), high-methoxyl pectin having a degree of methylation of about 60% (0.513 g) and $Na_2CO_3$ (0.480 g) were dry blended in a 50 ml flask. Glycerol (1.900 g) and water (23.970 g) at 70° C. were added. The flask was equilibrated at 70° C. for about 4 to 5 minutes. The unstoppered flask was placed in a pressure cooker (autoclave) which had been preheated to 100° C. The autoclave was closed and evacuated for about 5 to 6 minutes and brought to 15 psi, giving an internal temperature of 121° C. after about 3 minutes 45 seconds. The temperature was held at 121° C. for 5 minutes, then cooled to 100° C. (about 4 minutes 50 seconds). The flask was removed from the autoclave and cooled to room temperature (approximately 18° C.) in about 6 minutes. The supernatant was decanted from the crystalline precipitate (unreacted $Na_2CO_3$) onto a glass plate. This was baked in an oven at 150° C. for 3 minutes.

Data regarding the physical and chemical properties, microbiology and moisture and oxygen transmission rates of the polymer of the invention are set out below.

Physical Properties

Sparingly soluble in water at pH 7 and insoluble at pH 4.1.
Insoluble in 6.6 M urea.
Insoluble in 10% (w/v) SDS.
Insoluble in dimethyl sulfoxide.
Thermo-forming at 140° C.

Chemical Properties

Nitrogen; 7.3±0.4%.
Sodium; 1.7±0.2%.
Fat; Tr.
Carbohydrate; 22.6±0.4%
Moisture; 32.1±0.8%
Not attacked by the bacterial protease subtilisin but hydrolysed by bovine pepsin.
Microbiology
Standard Plate Count: None detected.
Coliforms: None detected.
Moisture Transmission
Moisture transmission was measured at 75% Relative Humidity and 23° C.
Mean transmission=7.96 g water.mm/m$^2$/day
Number of measurements=4
Standard deviation=1.71
Oxygen Transmission
Oxygen transmission was measured at 75% Relative Humidity and 20° C.
Mean transmission=11.37 ml $O_2$.mm/m$^2$/day
Number of measurements=2

As will be apparent from the above solubility data, the polymers of the invention have been found to be substantially insoluble—as noted above, the polymer is only sparingly soluble in water at pH 7, and is insoluble at pH 4.1. The polymers are also capable of being formed into films. Furthermore, the polymers have been found to have good tensile strength. They are capable of acting as barriers when cast into films, for example, as a barrier between liquid and solids. As will also be apparent from the above description, the polymers of the invention are non-toxic and edible, being formed from naturally occurring GRAS components. They are clear in appearance.

The polymers are also thermoforming at 140° C. This means that they are able to be moulded into a shape at this temperature and will retain that shape on cooling. This represents a distinction from traditional casein plastic derivatives.

Given the above combination of properties, the polymers of the invention have many potential uses. As outlined above, in one particularly preferred embodiment of the invention, the polymer is formed into an edible film, conveniently either by spraying or pouring the aqueous phase containing the polymer (resulting from the reaction between the acid casein and high-methoxyl pectin), onto a surface. It is believed that the edible films of the invention, which are substantially insoluble (unlike the prior art films discussed above) may prove useful in fabricating new convenience foods, by inhibiting cross-contamination of liquids and flavours in the same product. The polymer can also be sprayed onto the exterior surface of foods, such as coconut, cereal, peanuts or almonds, to form an edible film which can for example, protect the food from fungal growth. Where the food product coated with the film is to be incorporated into another food product such as confectionary, the film can prevent the migration of fats and flavours out into the surrounding food mass. The edible films of the invention can also be used to separate internal layers in a food product, such as a confectionary product.

Although in one preferred embodiment of the invention, the acid casein-high-methoxyl pectin polymers of the invention are used as edible films, these polymers have many other potential used. One such use is as an orthopaedic implant. For example, tendons may be attached to an orthopaedic plug comprising the polymer of the invention. The implant is gradually degraded in the body and replaced by bone. Orthopaedic implants comprising the polymers of the invention may have the advantage of having a lower toxicity than currently used implants, which are generally made of polyacrylamide.

Another potential use of the polymer of the invention is as a food product. For example, the polymer may be extruded into a desired shape, such as noodles. The casein content of the polymer means the food product has a substantial protein content and therefore considerable nutritive value.

Industrial Application

It can be seen that, at least in the preferred forms of the invention, a polymer of acid casein and high-methoxyl pectin is provided which has a number of potential uses. The invention therefore also provides edible films comprising the polymer, and food products comprising the polymer.

The provision of a polymer which is both non-toxic and suitable for use as an edible film, and which is also substantially insoluble, represents a great advance over the known art in this field, the implications of which will be well understood by those persons skilled in the art.

It will also be appreciated by those persons skilled in the art that the above description is provided by way of example only and the numerous variations and modifications may be made without departing from the scope of the invention as defined in the following claims.

What is claimed is:

1. A polymer comprising acid casein or a non-toxic soluble salt thereof and high-methoxyl pectin covalently cross-linked within the polymer into a 3-dimensional network, the polymer being substantially insoluble in water.

2. A polymer as claimed in claim 1 further comprising an edible plasticizer.

3. A polymer as claimed in claim 2 wherein the edible plasticizer is glycerol.

4. A polymer as claimed in claim 1 wherein the high-methoxyl pectin has a degree of methylation of greater than about 32%.

5. A polymer as claimed in claim 1 wherein the high-methoxyl pectin has a degree of methylation of about 60%.

6. A polymer as claimed in claim 1 wherein the ratio of acid casein or non-toxic soluble salt thereof: high-methoxyl pectin is from about 5.1:1 to 6:1.

7. A food product comprising a polymer as claimed in claim 1.

8. An edible film comprising a polymer as claimed in claim 1.

9. A food product which includes an edible film as claimed in claim 8, either internally or as a coating on all or part of an external surface of the food product.

10. A polymer which is substantially insoluble in water comprising acid casein or a non-toxic soluble salt thereof and high-methoxyl pectin covalently cross-linked within the polymer into a 3-dimensional network, wherein the polymer is prepared by reacting the acid casein or non-toxic soluble salt-thereof and the high-methoxyl pectin under alkaline conditions.

11. A polymer as claimed in claim 10 further comprising an edible plasticizer.

12. A polymer as claimed in claim 10 wherein the edible plasticizer is glycerol.

13. A polymer as claimed in claim 10 wherein the high-methoxyl pectin has a degree of methylation of greater than about 32%.

14. A polymer as claimed in claim 10 wherein the high methoxyl pectin has a degree of methylation of about 60%.

15. A polymer as claimed in claim 10 wherein the ratio of acid casein or non-toxic soluble salt thereof: high methoxyl pectin is from about 5.1:1 to 6:1.

16. A food product comprising a polymer as claimed in claim 10.

17. An edible film comprising a polymer as claimed in claim 10.

18. A food product which includes an edible film as claimed in claim 17 either internally or as a coating on all or part of an external surface of the food product.

19. A process of preparing a polymer comprising acid casein or a non-toxic soluble salt thereof and high-methoxyl pectin, the method comprising the steps of:

(a) forming a dispersion, comprising acid casein or a non-toxic soluble salt thereof and high-methoxyl pectin, in a non-toxic alkaline environment;

(b) heating the disperion for a sufficient time and at a sufficient temperature for reaction between the acid casein or non-toxic soluble salt thereof and the high-methoxyl pectin to take place;

(c) cooling the resulting reaction mixture;

(d) separating off from said mixture the resulting aqueous phase containing the polymer; and (e) heating the aqueous phase for a sufficient time and at a sufficient temperature to set the polymer.

20. A process as claimed in claim 19 wherein the dispersion further includes an edible plasticizer.

21. A process as claimed in claim 19 wherein step (a) comprises dispersing the acid casein or a non-toxic soluble salt thereof in water at a temperature of from about 60° C. to about 80° C., in the presence of a non-toxic base in an amount sufficient to adjust the pH of the dispersion to about 8.5 to about 9.

22. A process as claimed in claim 19 wherein in step (a) the acid casein or non-toxic soluble salt thereof is added in the form of acid casein, and is present in an amount of from about 8% to about 12% by weight of the dispersion.

23. A process as claimed in claim 19 wherein the high-methoxyl pectin has a degree of methylation of greater than about 32% and is present in the dispersion in an amount of about 1% to about 3% be weight of the dispersion.

24. A process as claimed in claim 19 wherein the edible plasticizer is glycerol, and is present in an amount of about 4% to about 8% by weight of the dispersion.

25. A process as claimed in claim 19 wherein step (b) comprises heating the dispersion under pressure, to a temperature of about 120° C. for about 3 to about 7 minutes.

26. A process as claimed in claim 19 wherein the step (e) the heating of the aqueous phase is at a temperature of from about 140° C. to about 160° C.

27. A polymer prepared by the process as claimed in claim 26.

28. A food product comprising a polymer prepared by the process as claimed in claim 26.

29. A process as claimed in claim 19 wherein step (d) comprises pouring off or spraying the resulting aqueous phase containing the polymer onto a surface to form a film.

30. An edible film prepared by the process as claimed in claim 29.

31. A food product which includes an edible film, prepared by the process as claimed in claim 29, either internally or as a coating on all or part of an external surface of the food product.

* * * * *